(12) United States Patent
Ahmad

(10) Patent No.: US 11,368,988 B2
(45) Date of Patent: Jun. 21, 2022

(54) METHODS TO ENABLE WLAN PROXIMITY SERVICE

(71) Applicant: InterDigital Patent Holdings, Inc., Wilmington, DE (US)

(72) Inventor: Saad Ahmad, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 15/413,072

(22) Filed: Jan. 23, 2017

(65) Prior Publication Data

US 2017/0202038 A1 Jul. 13, 2017

Related U.S. Application Data

(63) Continuation of application No. 14/440,312, filed as application No. PCT/US2013/067986 on Nov. 1, 2013, now abandoned.

(Continued)

(51) Int. Cl.
*H04W 76/10* (2018.01)
*H04W 12/0431* (2021.01)
(Continued)

(52) U.S. Cl.
CPC ............ *H04W 76/10* (2018.02); *H04W 4/80* (2018.02); *H04W 12/0431* (2021.01);
(Continued)

(58) Field of Classification Search
None
See application file for complete search history.

(56) References Cited

U.S. PATENT DOCUMENTS 8,279,851 B2 10/2012 Doppler et al.
9,622,156 B2* 4/2017 Calcev ................. H04W 48/16
(Continued)

FOREIGN PATENT DOCUMENTS

JP 2005-086451 3/2005
WO 09132169 A1 10/2009
(Continued)

OTHER PUBLICATIONS

Calcev et al., U.S. Appl. No. 61/716,235, filed Oct. 19, 2012.*
(Continued)

*Primary Examiner* — Faruk Hamza
*Assistant Examiner* — Cassandra L Decker
(74) *Attorney, Agent, or Firm* — Volpe Koenig

(57) ABSTRACT

Methods and apparatus are described for implementing a wireless local area network (WLAN) Proximity Service (ProSe) connection in a WLAN ProSe capable wireless transmit receive unit (WTRU). The WLAN ProSe capable WTRU requests an establishment of a WLAN ProSe connection with other WLAN ProSe capable WTRU(s), where a ProSe discovery process determines the presence of other WLAN ProSe capable WTRU(s). Configuration information is received, via a non-access stratum or a radio resource control message, from a network node to facilitate the WLAN ProSe connection to the other WLAN ProSe capable WTRU(s). The configuration information includes one of a WLAN ID of the other WLAN ProSe capable WTRU(s), a medium access control ID of the other WLAN ProSe capable WTRU(s), a WLAN access point Service Set Identification (SSID) or Basic SSID, a frequency or channel number, a beacon interval, and timing information.

11 Claims, 8 Drawing Sheets

Related U.S. Application Data

(60) Provisional application No. 61/721,321, filed on Nov. 1, 2012.

(51) Int. Cl.

| | | |
|---|---|---|
| *H04W 4/80* | (2018.01) | |
| *H04W 76/14* | (2018.01) | |
| *H04W 48/16* | (2009.01) | |
| *H04W 84/12* | (2009.01) | |
| *H04W 48/20* | (2009.01) | |
| *H04W 76/16* | (2018.01) | |
| *H04W 12/04* | (2021.01) | |
| *H04W 76/23* | (2018.01) | |

(52) U.S. Cl.
CPC ........... *H04W 48/16* (2013.01); *H04W 48/20* (2013.01); *H04W 76/14* (2018.02); *H04W 84/12* (2013.01); *H04W 12/04* (2013.01); *H04W 76/16* (2018.02); *H04W 76/23* (2018.02)

(56) References Cited

U.S. PATENT DOCUMENTS

| | | | | |
|---|---|---|---|---|
| 2006/0073847 A1* | 4/2006 | Pirzada | ................. | H04W 88/06 455/556.2 |
| 2007/0147315 A1 | 6/2007 | Khoury et al. | | |
| 2010/0011110 A1 | 1/2010 | Doppler et al. | | |
| 2011/0098043 A1 | 4/2011 | Yu et al. | | |
| 2011/0142241 A1* | 6/2011 | Goto | .......................... | H04L 9/16 380/279 |
| 2011/0258313 A1* | 10/2011 | Mallik | .................. | H04W 8/005 709/224 |
| 2011/0276412 A1* | 11/2011 | Mgrdechian | ....... | G06Q 30/0207 705/14.66 |
| 2013/0013926 A1* | 1/2013 | Hakola | ................. | H04W 12/04 713/171 |
| 2013/0034020 A1* | 2/2013 | Morgan | ................ | H04W 84/14 370/255 |
| 2013/0238702 A1* | 9/2013 | Sheth | ...................... | H04L 67/38 709/204 |
| 2013/0288645 A1 | 10/2013 | Zheng | | |
| 2014/0036793 A1* | 2/2014 | Johnsson | ............ | H04W 72/044 370/329 |
| 2014/0073288 A1* | 3/2014 | Velasco | ................. | H04W 12/06 455/411 |
| 2014/0092800 A1* | 4/2014 | Cho | ....................... | H04W 72/04 370/311 |
| 2014/0092885 A1 | 4/2014 | Venkatachalam et al. | | |
| 2014/0204924 A1 | 7/2014 | Ryu et al. | | |
| 2015/0019339 A1 | 1/2015 | Van Phan et al. | | |
| 2015/0065154 A1* | 3/2015 | Van Phan | ........... | H04W 72/042 455/450 |
| 2015/0172037 A1* | 6/2015 | Morita | .................. | H04W 76/14 370/329 |
| 2015/0281953 A1 | 10/2015 | Liu et al. | | |
| 2015/0289125 A1* | 10/2015 | Van Phan | ............. | H04W 76/14 455/434 |
| 2017/0122607 A1* | 5/2017 | Son | .......................... | F24F 6/16 |

FOREIGN PATENT DOCUMENTS

| | | |
|---|---|---|
| WO | 11/130623 | 10/2011 |
| WO | 2011/146513 A1 | 11/2011 |

OTHER PUBLICATIONS

Renesas Mobile Europe Ltd., "FS_ProSe: Considerations on application authorization," 3GPP TSG-SA WG1 #59, S1-124046, Edinburgh, UK (Nov. 12-16, 2012).
US Dept. of Commerce (NIST) et al., "Fs_ProSe: Public Safety Resources, Use, and Discovery Use Cases and Requirements," 3GPP TSG-SA WG1 #58, S1-121337, Seville, Spain (May 7-11, 2012).
Catt, "Solution for WLAN direct communication," SA WG2 Meeting S2#98, S2-132520, Valencia, Spain (Jul. 15-19, 2013).
Huawei et al., "ProSe WLAN use case clarification," 3GPP TSG-SA WG1 Meeting #59, S1-122141 (Jul. 30-Aug. 2, 2012).
Intel Corporation et al., "New Study Item Proposal for Radio Level Dynamic Flow Switching between 3GPP-LTE and WLAN," 3GPP TSG RAN#53, RP-111104 (Sep. 13-16, 2011).
Intel et al., "EPC support of ProSe communication over WLAN: Possible architecture and required functionality," S2-130324, Prague (Jan. 22, 2013).
Intel et al., "Use case: EPS ProSe Discovery for WLAN Direct Communication," 3GPP TSG-SA WG1 Meeting #59, S1-122419, Chicago, USA (Jul. 2012).
Intel, "Operator Managed and Operator Assisted D2D," 3GPP TSG-SA WG1 Meeting #57, S1-120063 (Feb. 13-17, 2012).
Third Generation Partnership Project, "Technical Specification Group Services and System Aspects; Study on architecture enhancements to support Proximity-based Services (ProSe) (Release 12)," 3GPP TR 23.703 V0.7.1 (Sep. 2013).
Third Generation Partnership Project, "Technical Specification Group Services and System Aspects; Feasibility study for Proximity Services (ProSe) (Release 12)," 3GPP TR 22.803 V12.2.0 (Jun. 2003).
Third Generation Partnership Project, "Technical Specification Group SA; Feasibility Study for Proximity Services (ProSe) (Release 12)," 3GPP TR 22.803 V1.0.0 (Aug. 2012).
TSA SA WG1, "WID on Proposal for a study on Proximity-based Services," 3GPP TSG SA Plenary Meeting #53, SP-110638 (Sep. 1-21, 2011).
Wi-Fi Alliance Technical Committee P2P Task Group, "Wi-Fi Peer-to-Peer (P2P) Technical Specification Version 1.2," pp. 1-159 (Dec. 2011).
ZTE, "Clarification of requirements on application visibility of ProSe status," 3GPP TSG-SA WG1 Meeting #59, S1-122429 (Jul. 30-Aug. 2, 2012).
WIFI Alliance, "Wi-Fi Simple Configuration Protocol and Usability Best Practices for the Wi-Fi Protected Setup Program," Version 2.0.1 (Apr. 2011).
Interdigital, "Interaction of ProSe with applications," 3GPP TSG-SA WG1 #59, S1-122202, Chicago, Illinois (Jul. 30-Aug. 3, 2012).

\* cited by examiner

METHODS TO ENABLE WLAN PROXIMITY SERVICE

CROSS REFERENCE TO RELATED APPLICATIONS

This application is a continuation of U.S. patent application Ser. No. 14/440,312 filed May 1, 2015, which claims the benefit of PCT Application No. PCT/US2013/067986, filed Nov. 1, 2013, and U.S. provisional application No. 61/721,321, filed Nov. 1, 2012, the contents of which are hereby incorporated by reference herein.

BACKGROUND

Proximity-based services involve devices that are within proximity of each other. These devices are able to exchange data, for example, if they are running similar applications.

Currently, traffic and signaling are generally routed in the network, and proximity-based services are not widely implemented. However, there are widespread applications for which proximity based services may be desired, including: commercial/social use, network offloading, public safety, integration of current infrastructure services, and to assure the consistency of the user experience including reachability and mobility aspects.

Accordingly, methods and apparatus to enable wireless local area network based proximity service are desired.

SUMMARY

Described herein are methods and apparatus for enabling a wireless local area network (WLAN). A network may be configured to establish a WLAN Proximity Service (ProSe) connection between WLAN ProSe capable wireless transmit/receive units (WTRUs) based on a trigger or request. The triggers or requests for establishing the WLAN ProSe connection may be generated by the WLAN ProSe capable WTRU or come from the network. The methods further describe how to enable an evolved-Node-B (eNB) or Mobility Management Entity (MME) to discover an access point (AP) in a predetermined area to facilitate the WLAN ProSe connection. Other described methods facilitate connection establishment procedures, for example, the network may provide configuration information to the WTRU via Radio Resource Control (RRC) or Non-Access Stratum (NAS) signaling to establish the connection. The WLAN ProSe connection may be via a WLAN AP or a WLAN ProSe direct link connection between WLAN ProSe capable WTRU(s).

In an example direct link method, a WLAN ProSe capable WTRU triggers or requests an establishment of a WLAN ProSe connection with other WLAN ProSe capable WTRU (s), where a ProSe discovery process is used to determine the presence of other WLAN ProSe capable WTRU(s). The WTRU receives configuration information from a network node to facilitate the WLAN ProSe connection to other WLAN ProSe capable WTRU(s). The configuration information includes one of a WLAN ID of the other WLAN ProSe capable WTRU(s), a medium access control (MAC) ID of the other WLAN ProSe capable WTRU(s), a WLAN access point Service Set Identification (SSID) or Basic SSID (BSSID), a frequency or channel number, a beacon interval, and timing information.

BRIEF DESCRIPTION OF THE DRAWINGS

A more detailed understanding may be had from the following description, given by way of example in conjunction with the accompanying drawings wherein.

DETAILED DESCRIPTION

Figure 1A:
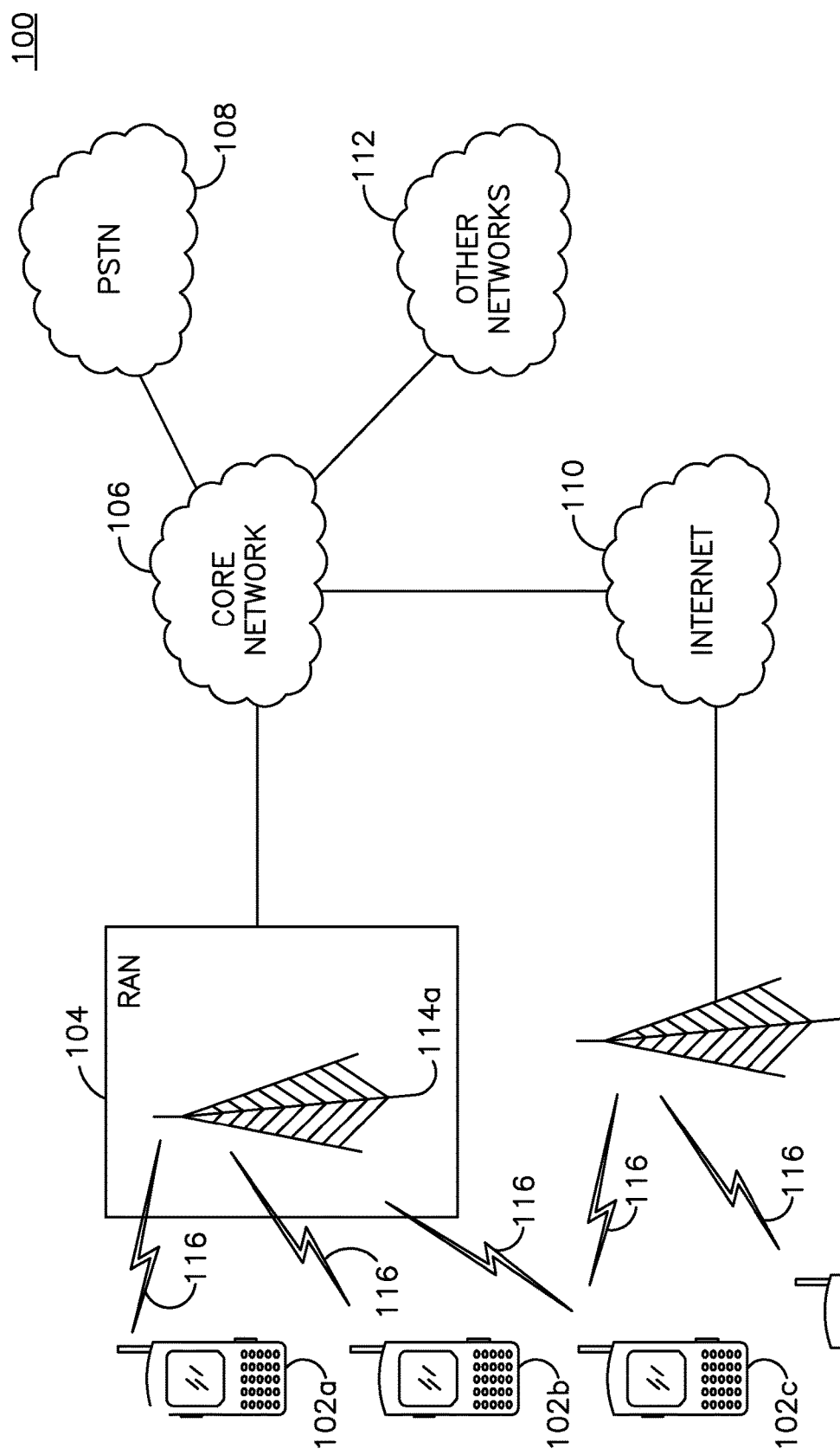
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
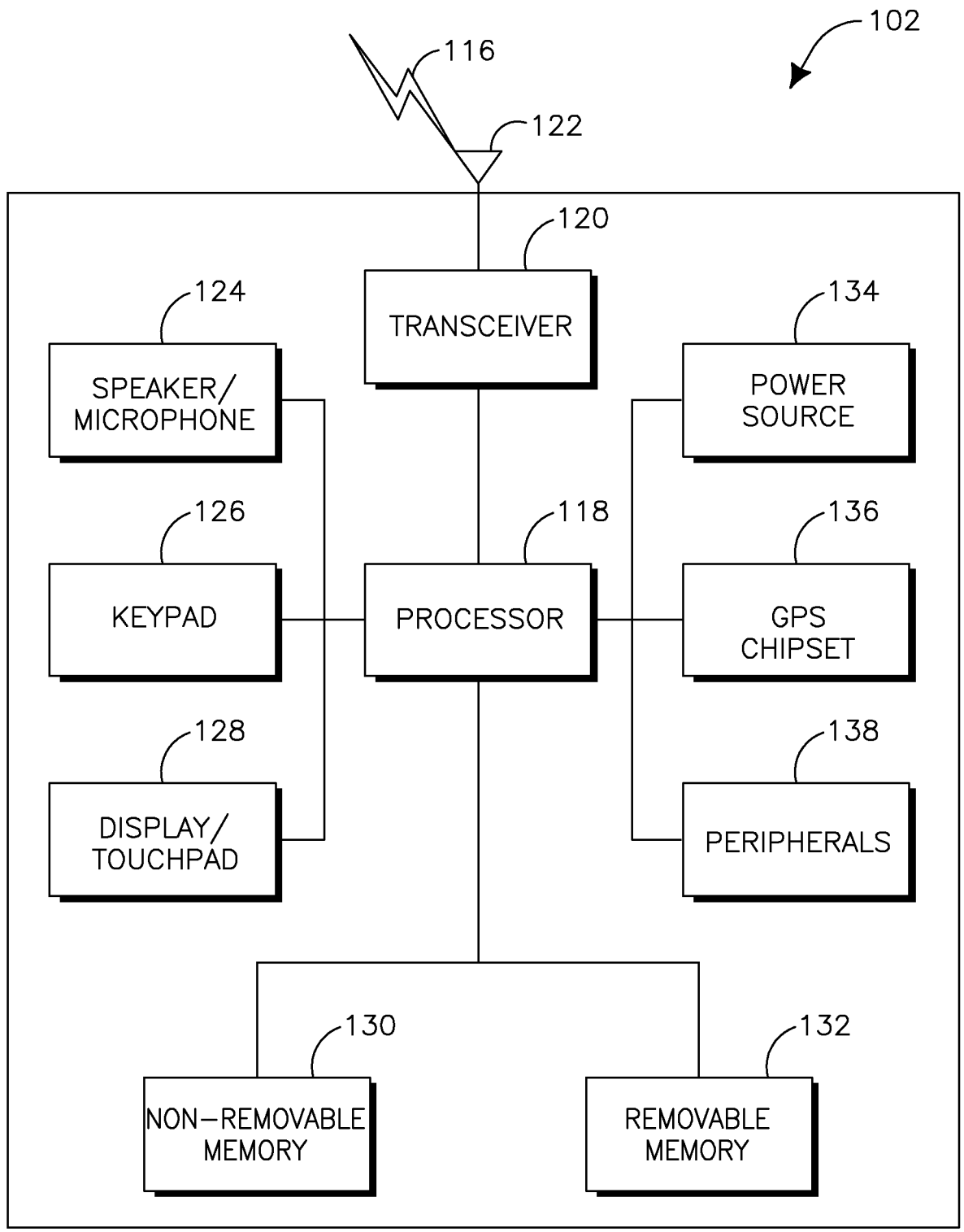
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
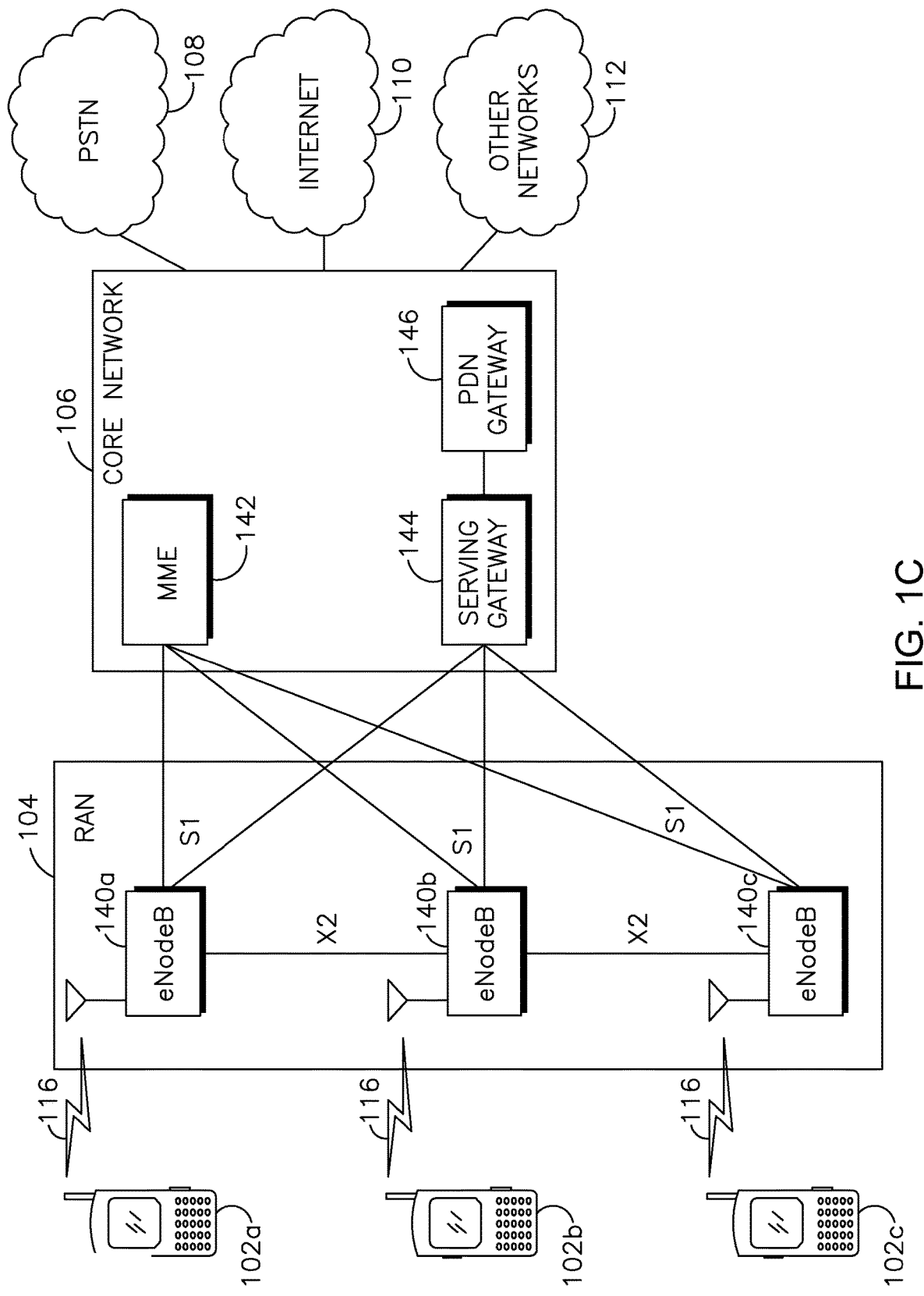
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Proximity-based Services may involve the WTRU proximity discovery, the WTRU consent to being discoverable, contactable or conversational, the proximity WTRU to WTRU communications and the controllability and policies by the network or operators to the discovery, discoverability and the subsequent forms of communication.

Figure 2:
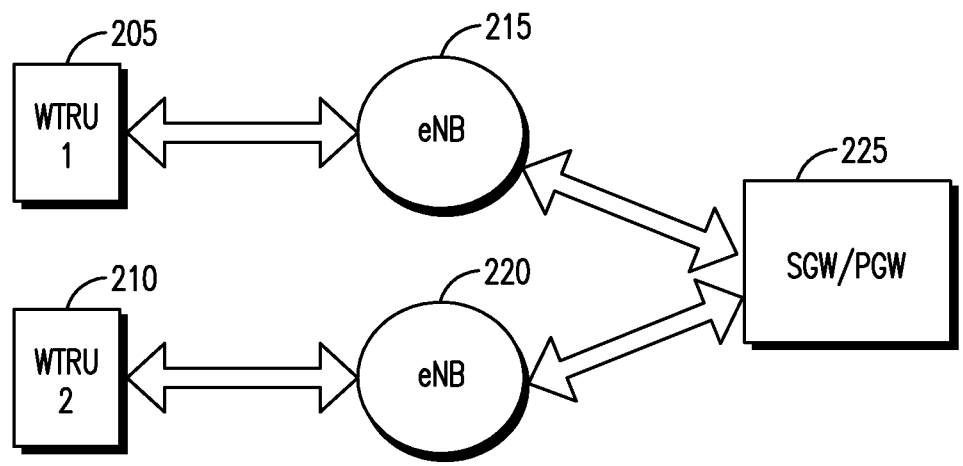
FIG. 2 shows an example scenario where a network or wireless transmit/receive units (WTRUs) determine that they are within a predetermined proximity.

FIG. 2 shows a WTRU1 205, a WTRU2 210, an eNB 215, an eNB 220 and a Serving Gateway (SGW) and Packet Data Network Gateway (PDN GW) SGW/PDN GW 225 in an example embodiment where the network or WTRUs, (WTRU1 205, WTRU2 210 or both), determine that they are within a predetermined proximity. In this embodiment, communication between WTRU1 205 and WTRU2 210 is performed via eNB 215, eNB 220 and the core network (CN) nodes such as the SGW/PDN GW 225.

Communications between proximity WTRUs may be enhanced to take other paths such as direct, (i.e. direct radio path in licensed/unlicensed spectrum within certain distances), or indirect, (through network elements—intra/inter-cell or intra/inter-eNB), or S-GW, and the like), which may be controlled by the network or by operators.

Figure 3:
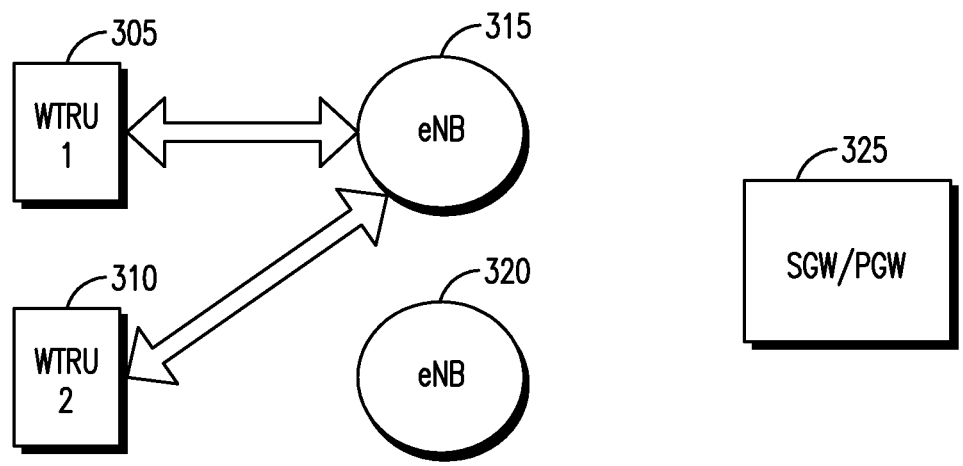
FIG. 3 shows an example of additional paths for proximity communication.

FIG. 3 shows a WTRU1 305, a WTRU2 310, an eNB 315, an eNB 320 and a SGW/PDN GW 325 in an embodiment of an indirect path for proximity communication. In this embodiment, the network or WTRUs, (WTRU1 305, WTRU2 310 or both), determine that they are within a predetermined proximity. The communication between WTRU1 305 and WTRU2 310 is performed via eNB 315.

Figure 4:
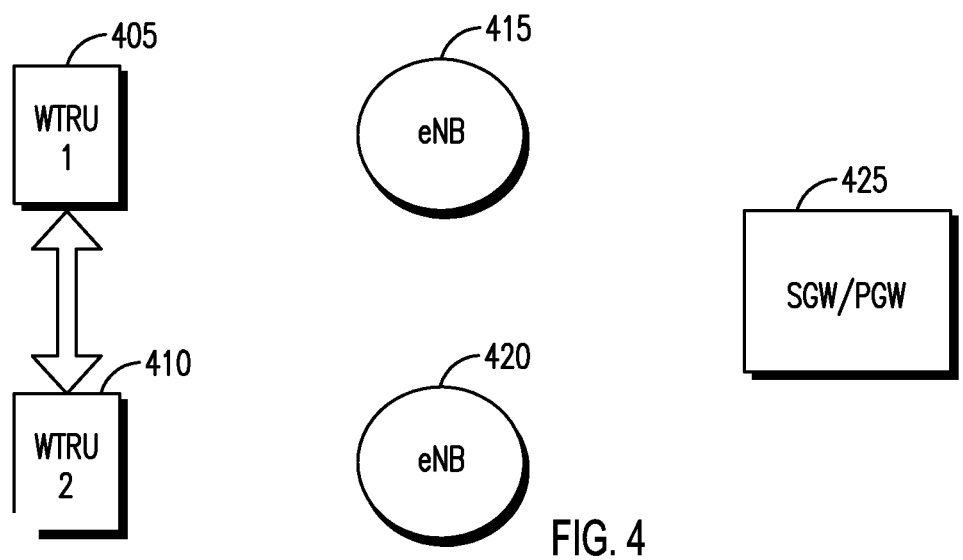
FIG. 4 shows an example where the data path for communication is WTRU to WTRU directly over an air interface.

FIG. 4 shows a WTRU1 405, a WTRU2 410, an eNB 415, an eNB 420 and a SGW/PDN GW 425 in an embodiment of a direct path for proximity communication. In this embodiment, the network or WTRUs, (WTRU1 405, WTRU2 410 or both), determine that they are within a predetermined proximity. The communication between WTRU1 405 and WTRU2 310 is performed directly over the air interface.

The proximity service data path selection, (direct, or indirect over a certain path in the infrastructure), may be determined by the radio or network coverage, load conditions or by policies set by network or operators. Proximity-Based Services are expected to be supported in network sharing deployments.

In another embodiment, a direct communication may be used between proximity service (ProSe) enabled WTRUs that have wireless local area network (WLAN) capability. To enable such communication, the Third Generation Partnership Project (3GPP) Evolved Packet Core (EPC) may provide WLAN configuration information to the WTRUs involved in proximity communication.

In another embodiment, the cellular network may be configured to switch a communication from a cellular infrastructure path to a WLAN ProSe path and vice versa. This switch may be initiated, for example, when two WTRUs are engaged in a data session, (including one or more flows), routed over the mobile network operator's (MNO's) core network infrastructure and these WTRUs move within WLAN communication range. The cellular system may switch their data session to the WLAN ProSe communication path. Later, when the same WTRUs move out of WLAN communication range, the cellular system may switch their data session back to the MNO's infrastructure path.

Wi-Fi (WLANs) may be used to offload a 3GPP Long Term Evolution (LTE) system from user plane traffic. In one embodiment, an eNB may be collocated with a Wi-Fi access point (AP), the eNB may dynamically or semi-statically send data over an LTE air interface and a Wi-Fi AP air interface. The LTE user plane traffic may be partially or totally offloaded on to Wi-Fi. The offload method, e.g. the protocol layer, (such as Packet Data Convergence Protocol (PDCP), Radio Link Control (RLC) and the like), at which offload may occur may be preconfigured or dynamically selected.

Figure 5:
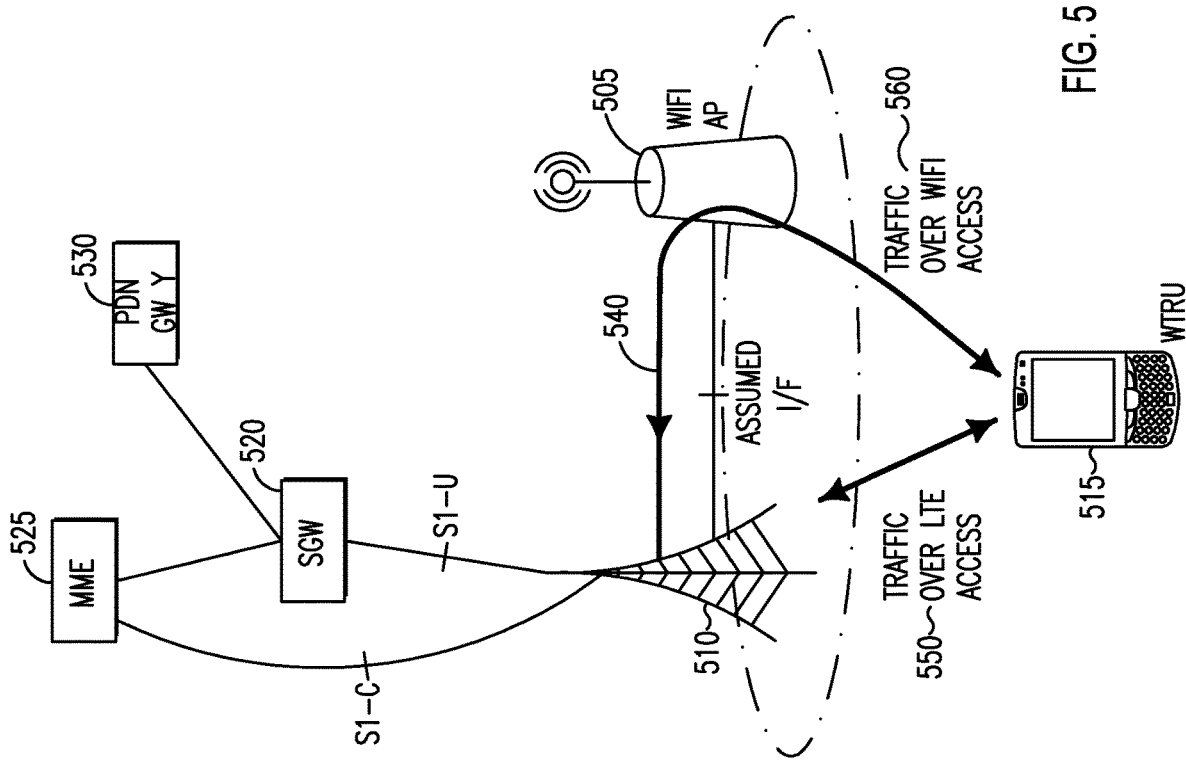
FIG. 5 shows an example method wherein communication traffic is offloaded over Wi-Fi.

FIG. 5 shows an example embodiment and method where communication traffic is offloaded over Wi-Fi. The embodiment shows an AP 505, an eNB 510, a WTRU 515, a SGW 520, a MME 525 and a PDN GW 530. The AP 505 is connected to the collocated eNB 510 via link 540, (including interface for exchanging information). The eNB 510 is configured to offload a portion of the download traffic being sent over LTE link/air interface 550 over the Wi-Fi link/air interface 560. On a condition that the eNB 510 has determined that the WTRU 515 is connected to the Wi-Fi AP 505, the eNB 510 may offload downlink traffic over the Wi-Fi AP link 560. The WTRU 515 may be configured to receive data from the eNB 510 and the Wi-Fi AP 505 nearly simultaneously. In the uplink, the WTRU 515 may be configured to transmit a portion of data over the LTE air interface 550 and another portion of data over the Wi-Fi air interface 560. The Wi-Fi AP 505 may then be configured to forward to the eNB 510 data received from the WTRU 515, via interface 540 that connects the eNB 510 and the AP 505.

To enable proximity connection between two WTRUs, a new network node is being defined in the 3GPP network architecture called a proximity service (ProSe) server or function. The ProSe server in the network, (as part of EPS), has a reference point towards the ProSe Application Server, towards the EPC and the WTRU. The functionality may include, but is not restricted to: interworking via a reference point towards third party applications; authorization and configuration of the WTRU for discovery and direct communication are controlled by a home public land mobile network (HPLMN) ProSe function in a non-roaming case and by the HPLMN or visited public land mobile network (VPLMN) ProSe function in a roaming case; enable the functionality of the EPC level ProSe discovery; ProSe related new subscriber data and/handling of data storage;

handling of ProSe identities; security related functionality; provide control towards the EPC for policy related functionality; and provide functionality for charging, (via or outside of EPC, e.g. offline charging).

Figure 6:
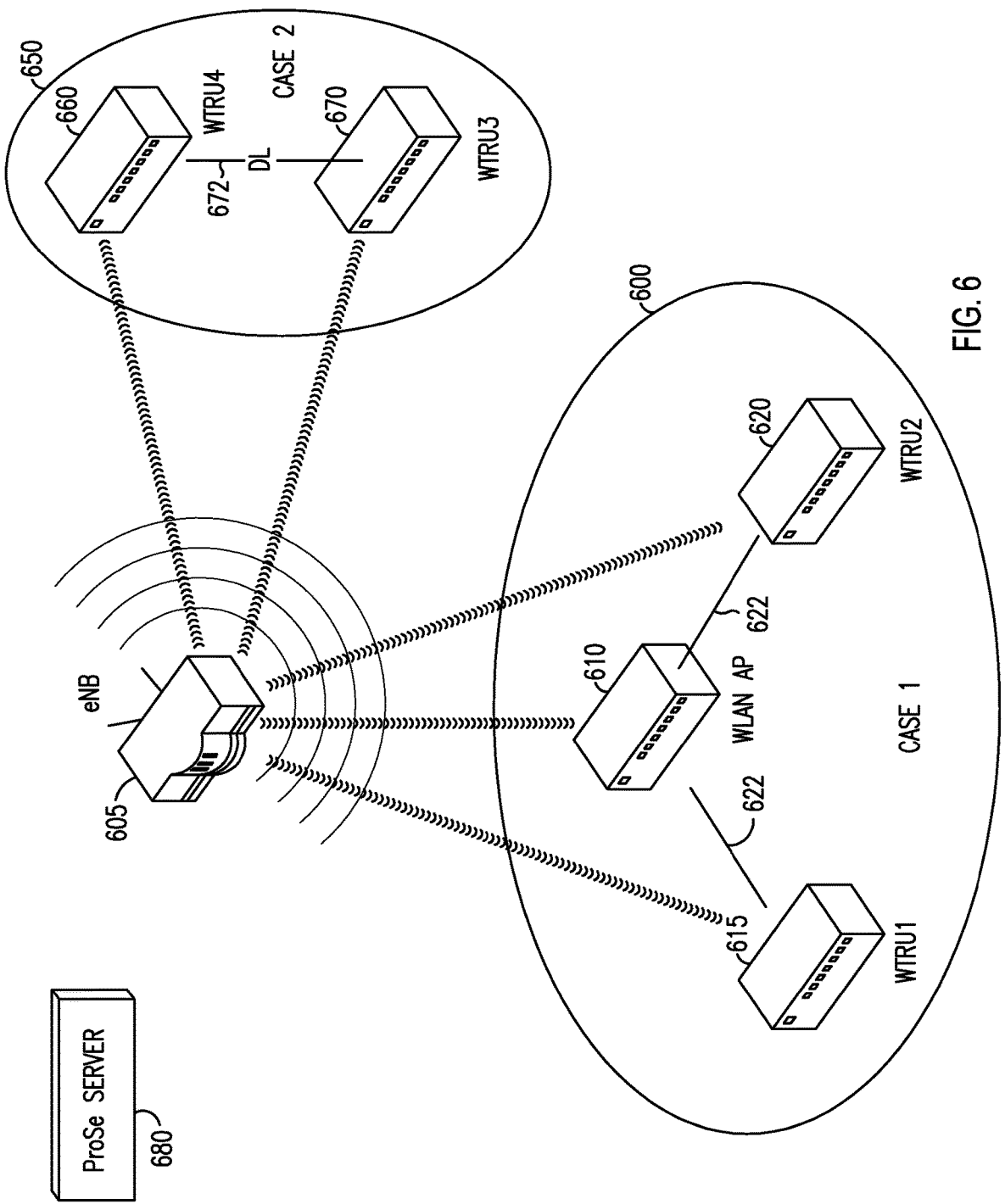
FIG. 6 shows two example cases of enabling proximity service (ProSe) using wireless local area network (WLAN)

FIG. 6 shows two example embodiments or cases of enabling ProSe using WLAN. A first case or embodiment 600 includes an eNB 605, a WLAN AP 610, a WTRU1 615 and a WTRU1 620. The eNB 605 is connected to the WLAN AP 610 via a link 612, which may be, for example, an I/F interface. A WLAN ProSe connection 622 is shown between devices connected to the WLAN AP 610, which may be controlled by a 3GPP system, for example, via eNB 605. A second case or embodiment 650 shows a direct link connection 672 between WTRU3 660 and WTRU4 670. In this case 650, there may be no WLAN AP in the WLAN ProSe connection 672. This type of direct WLAN ProSe connection 672 may be implemented as a WLAN ad hoc connection, a Wi-Fi direct type of connection or any other direct link connection. As described herein below, the WLAN ProSe connections 622 and 672 may be managed by the eNB 605 or the 3GPP system. The configuration for the WLAN AP 610 may be provided by the 3GPP system. The 3GPP system may be able to request when to start or tear down the WLAN ProSe connection or change it back to the 3GPP based ProSe connection. A ProSe server 680 may be included for use in both embodiments 600 and 650 as described herein below. Communication between the ProSe server 680 and a WTRU, such as WTRUs 615, 620, 660 and 670 may take place either via user plane or control plane. For example, communications may take place between a mobility management entity (MME) or Non-access stratum (NAS) messaging. The ProSe server 680 authorizes the ProSe connection and assigns ProSe IDs. The term cellular system or network includes, but is not limited to, a 3GPP system or network, which in turn includes, but is not limited to, a LTE system or network. The term WLAN includes, but is not limited to, WiFi, 802.11 based systems and the like. The terms system and network are used interchangeably.

Described herein are triggers for establishing a WLAN ProSe connection. The triggers for establishing the WLAN ProSe connection may be based on triggers initiated by the WTRU or triggers that may be signaled from the cellular network such as a 3GPP network. The cellular network may establish a WLAN ProSe connection between WLAN-capable WTRUs based on these triggers. These triggers may also be used to move an existing LTE based ProSe connection to a WLAN based ProSe connection, for example.

The WTRU may initiate triggers including user preference triggers, application preference triggers, WTRU switch triggers, and public safety triggers.

In an embodiment, user preference triggers may be used for establishing a WLAN ProSe connection. A user may prefer to use WLAN for ProSe communication, for example, for billing reasons or saving network bandwidth. The WTRU may include a configuration/setting to select a preference for WLAN ProSe offloading. The user may select WLAN ProSe as a preferred choice for ProSe. This preference may be indicated to the network upon initial registration or separate signaling requesting a ProSe connection. If the request is sent upon initial registration the WTRU may send the request again on a condition that the user preference changes. This indication may be sent to the network as a new message, (e.g. new Radio Resource Control (RRC) message or new Non-access stratum (NAS) message), or as a new Information Element (IE) in an existing RRC or NAS message. Alternatively, this change in preference may be indicated as an application level signaling to the ProSe server.

In another embodiment, an application preference trigger may be used to establish a WLAN ProSe connection. ProSe applications may be configured to set a default preference to use WLAN ProSe communication over cellular or 3GPP based ProSe communication. When such an application is operating on the WTRU, the WTRU may send an indication to the ProSe server via application level signaling that a WLAN ProSe connection is preferred. The ProSe server may then contact a Mobility Management Entity (MME) or other nodes in the EPC network to enable the WLAN ProSe connection. Alternatively, when the application requires or prefers a WLAN ProSe connection, the application may access Application Programming Interfaces (APIs) in the WTRU's operating system between the application and the protocol stack to indicate the preference. Once the WTRU has determined that an application has requested to use WLAN for ProSe communication, the WTRU may directly send an indication to the network via RRC or NAS signaling to establish or switch the connection to WLAN ProSe connection.

In another embodiment, when one of the WTRUs or an application on one of the WTRUs makes a request to switch to WLAN ProSe communications, this may in turn trigger the network to request the other WTRU to turn on its WLAN radio for proximity. This assumes that the network has determined that the other WTRU is WLAN ProSe capable.

In another embodiment, a public safety trigger may be used for establishing a WLAN ProSe connection. In a public safety scenario, the WTRU may be configured to transmit distress signals using both WLAN ProSe and LTE/cellular ProSe. This may increase the chance of the distress signal reaching the recipient. The WTRU may be configured to determine that a disaster condition exists. To transmit a distress signal, the WTRU may activate both the WLAN radio and LTE/cellular radio and send public safety ProSe signals using both. The distress signal may be received by the Earthquake and Tsunami Warning System (ETWS) type system or some other system implemented for such disaster scenarios.

The triggers to establish the WLAN based ProSe connection may be sent from different nodes in the EPC network. Based on the WLAN capabilities of the WTRUs involved in the proximity communication, the network may establish the WLAN ProSe connection. Alternatively, the network may initiate a switch from a 3GPP/cellular based proximity connection to a WLAN ProSe connection based on the WTRU's capabilities. The triggers may be sent from eNB, MME, ProSe server or another node in the EPC network.

In an example embodiment of a network initiated trigger, the eNB or MME may periodically request the WLAN-capable WTRUs to perform WLAN measurements to determine whether they are within a predetermined proximity with a WLAN AP or other WLAN-capable WTRUs. Based on these measurements the network may trigger connection establishment for a WLAN/Wi-Fi ProSe connection.

In another example embodiment of a network initiated trigger, the WTRUs may be switched from a LTE ProSe connection to WLAN ProSe connection when the WTRUs involved in a proximity connection enter the ProSE area that supports WLAN capability. For example, this scenario may apply when eNB has an interface with the WLAN AP, as shown in FIG. 6. When the eNB 605 determines that both WTRU1 615 and WTRU2 620 are in the proximity area and are able to be served by the WLAN AP 610, the eNB 605 may request WTRU1 615 and WTRU2 620 to switch their proximity connection to the WLAN proximity connection through the WLAN AP 610 connected to the eNB 605.

In another example embodiment of a network initiated trigger, the network may switch from a 3GPP/cellular based ProSe connection to a WLAN ProSe connection for offload purposes, for example, when the network is congested. In this scenario, the eNB or MME may receive a request for a cellular ProSe connection and may also determine that there is a predetermined level of congestion at the eNB. The eNB may then indicate to the MME that it is congested and that it may not able to satisfy the quality of service (QoS) required for the cellular ProSe connection. The MME upon receiving such indication may request the WTRU to establish a WLAN ProSe connection. The WTRUs may then perform WLAN proximity discovery, (for example, if they have not discovered each other), before establishing a WLAN ProSe connection.

Described herein is a method for performing a WLAN ProSe connection via the WLAP AP. In this scenario, a WLAN ProSe capable WTRU signals the LTE network of the WTRU's capabilities. This signaling may also inform the LTE network of the capabilities for a WLAN for proximity communication. These capabilities may be transmitted by the WTRU upon registration in the attach message or a new NAS message. Alternatively, the WTRU may send these capabilities when the ProSe feature is activated in the WTRU. Alternatively, the WTRU may send these capabilities when a request or a PDN connection request is sent by the WTRU for ProSe connection. Alternatively, the network may request the WTRU to send the WLAN capabilities when the network has determined to establish or switch the connection to a WLAN ProSe connection.

Described herein are methods for discovery of WLAN AP by the network. As described above, the WLAN ProSe connection is performed through the WLAN AP. The network may therefore be configured to discover the WLAN AP. The eNB, MME or other network node may discover the WLAN AP in a predetermined area, for example, a ProSe Area or Tracking Area, so that the WLAN AP may be used to establish the WLAN ProSe connection. The eNB, MME or other network node may perform the WLAN AP discovery using one or more of the following methods.

In one example embodiment of WLAN AP, the WLAN AP may be collocated with the eNB, as shown, for example in FIG. 5. In this configuration the eNB may not need to perform a WLAN AP discovery process. The eNB in this configuration may already know the credentials of the WLAN AP and the configuration information for the WLAN network.

In another example embodiment, the WLAN AP may be a third party AP which may controlled by the LTE/cellular network. In such a scenario, the information about these wireless hotspots and the location may be available in the network database, for example, in an operations and maintenance (O&M) or access network discovery and selection function (ANDSF) node. When the eNB or MME may need to initiate establishment of a WLAN ProSe connection, it may query the O&M node to determine a list of available WLAN APs in a predetermined area. Based on this list, the network may then select the best available WLAN AP for the WLAN ProSe connection.

In another example embodiment, the WLAN AP may register itself with a proximity server or another network node, allowing the network to select a best WLAN AP for a predetermined ProSe connection. The eNB or MME in the network may query the ProSe server to determine a list of available WLAN APs and the configuration information of these corresponding WLAN APs. The best WLAN AP may be selected from the list, based on some predetermined criteria, and its configuration information may be sent to the WTRUs involved in the proximity connection.

As noted herein above, a proximity server may be configured to register the WLAN AP for the WLAN ProSe connection through the WLAN AP. This proximity server may be configured to create a database of WLAN APs in different proximity areas or tracking areas. The proximity server may provide a list of WLAN APs in a particular region when queried by the eNB, MME or some other network node.

The registration for the WLAN ProSe may include parameters such as WLAN AP identity related information, security related information, and location relation information.

Parameters concerning WLAN AP identity-related information, (e.g. parameters required for 802.11 WLAN network identification), may include at least one of the following: an identity of the WLAN/Wi-Fi network, (e.g. Basic Service Set Identification (SSID) and/or a medium access control (MAC) address); access credentials such as subscriber-based parameters, for example; operating channel/operating frequency; and/or supported access data rates.

Parameters concerning security-related information, (e.g. parameters required for 802.11 authentication), may include at least the type of security protocol, (e.g. a Wired Equivalent Privacy (WPA), Wi-Fi Protected Access (WPA) or WPA II (WPA2)). The security related information may include at least the type of encryption algorithm, (e.g. Temporal Key Integrity Protocol (TKIP), a Pre-Share Key mode (PSK)). Additionally the security-related information may include the security key, which may include, for example, a string of hexadecimal digits, a bit string, and the like. The security key may correspond to information from which a WLAN/Wi-Fi device further derives the encryption key using a known key derivation function.

Parameters concerning location-related information may include a location area for the proximity service. This may include the tracking area ID of the location or the eNB ID for the eNB under which the WLAN AP is operating.

Described herein are methods for device discovery for WLAN ProSe. Before the WLAN ProSe communication is established, (i.e. data path for WLAN ProSe is established), the WTRUs involved in the communication may need to determine that they are within a predetermined proximity that enables the WTRUs to communicate via the WLAN interface at, for example, a predetermined QoS. The network may receive a request for a ProSe connection from a WTRU which may then initiate the discovery process. Alternatively, discovery process may be initiated when the network determines that two WTRUs that are communicating with each other are in a predetermined proximity of a WLAN AP.

In the WLAN ProSe connection method performed through the WLAN AP, the network may receive a request for ProSe connection from a WTRU. The network may then initiate a 3GPP or LTE based ProSe discovery process. This 3GPP or LTE based ProSe discovery process may determine that the WTRUs are able to connect via ProSe. Once this process is complete, the network may establish WLAN ProSe connection. This determination may be based at least in part on a trigger, such as the triggers described heretofore. After the network determines that a WLAN ProSe connection is to be established, the network may be configured to perform WLAN ProSe discovery.

Described herein are example methods for performing WLAN ProSe discovery. When the network receives the request for a ProSe connection, the request may contain identification information of other WTRUs with which the ProSe connection may be established (e.g. ProSe ID, Proximity ID, application ID or the like). On a condition that the network initiates discovery for WLAN ProSe, the network may transmit the corresponding WLAN ProSe identification for the WLAN discovery process. This identification may be transmitted as part of the configuration information or it may be transmitted separately at the discovery stage. The eNB may be configured to query the ProSe server or the MME or some other node in the EPC network. The network node providing the WLAN ProSe identity may determine a mapping between the ProSe ID and the corresponding WLAN ProSe ID. In response to a query with the ProSe ID, the network node may respond by with a message including the WLAN ProSe ID. The network may query the WLAN ProSe ID of the WTRUs involved in the proximity connection and may then transmit the WLAN ProSe ID to the WLAN AP. The WLAN ProSe ID may be used setup the WLAN proximity connection. The WLAN AP may be configured to use this information to discover the WTRUs which require proximity connection. This WLAN ProSe ID may one or more of the following: 1) WLAN Interface IP address of the WTRU; 2) MAC ID of the WTRU; 3) device name set by the user or assigned by the network; and/or 4) device specific identity assigned by the WLAN AP.

The network may be configured to transmit the WLAN AP information to the WTRUs performing WLAN proximity discovery. The WTRUs may be configured to receive this information and determine whether they are able to connect to the WLAN AP. The WLAN AP information transmitted to the WTRUs may include the WLAN AP SSID or BSSID; the frequency and or/channel number; the type of 802.11 technology supported by the AP; the beacon interval; and/or the synchronization information, (e.g. time stamp).

The WTRUs and the AP may then use the WLAN radio and the information provided by the network to determine if they are in WLAN radio proximity of each other. To determine radio proximity, the WLAN AP may be configured to send a probe request to each of the WTRUs. The WTRU may determine radio proximity by monitoring beacons transmitted by the WLAN AP. The number of beacons that the WTRU monitors may be provided to the WTRU by the network. Alternatively, the WTRU may send a probe request to the WLAN AP and wait for the probe response.

After the WTRUs and the WLAN AP determine the WLAN radio proximity, the WTRUs and the WLAN AP may then signal the network about the result of this WLAN discovery. Based on this information the network may then determine whether to establish the user plane path for this WLAN proximity connection request.

After the discovery process is complete, the network, (eNB, MME or like network node), may be configured to initiate a connection establishment procedure. The network may provide configuration information to the WTRU to establish connection establishment. This information may be transmitted through a RRC or NAS message. This configuration information may include one or more of the following information. For example, the configuration information may include association parameters to associate to the WLAN AP (e.g. the data rate, security key such as WPA, WPA2 and the like). In another example, the configuration information may include a QoS access category (AC) to WTRU's, (e.g. for a WLAN that supports QoS (i.e. 802.11e)). In another example, the configuration information may identify capabilities regarding the direct link feature of 802.11. For example, the configuration information from the network may signal if the tunneled Direct Link (TDLS) may be used or the 802.11z based direct link may be used. This information may be signaled if the WTRUs uses the direct link feature. In another example, the configuration information may identify a time period for which this WLAN ProSe connection is being established. In another example, the configuration information may identify an inactivity time period after which the link may be torn down. This is the period of time for which if there is no data transmission on the WLAN ProSe connection the link may be disconnected. In another example, the configuration information may include whether or not the WTRUs may perform contention based access or contention free access in WLAN.

When the WTRUs receive these configurations from the network, it may be an implicit indication from the network to start the WLAN ProSe connection and then some or all of the ProSe data from the WTRU may be transmitted over WLAN. Alternatively, the network may send an explicit indication as an existing or new RRC or NAS message indicating the start of a WLAN ProSe connection. If the WTRU and the network have already established data radio bearers for data transmission, the network may also indicate the identification of the bearer(s) that needs to be switched to the WLAN/Wi-Fi path. The network may also indicate to the WTRU the target address, e.g. the destination Internet Protocol (IP) and MAC address of the other WTRU.

The WTRU and the network may be configured to initiate connection termination based on a trigger. For example, triggers for connection termination may include the following: 1) a Proximity Data session has finished; 2) one of the WTRUs moved out of the coverage of WLAN AP; 3) the LTE/cellular network is determined to not be congested; 4) the WLAN network is determined to be congested; 5) battery saving; 6) handover to an eNB that does not support WLAN/Wi-Fi offload; and 7) a request is received from an application for more secure communication.

For a network initiated connection termination, the network may transmit a request that the WLAN AP terminate the WLAN ProSe connection. The WLAN AP may then tear down the connection and signal the WTRUs that the WLAN ProSe connection has been deactivated. Alternatively, the network may directly inform the WTRUs and the WTRU may initiate the WLAN connection tear down procedure.

For a WTRU initiated connection termination, a WTRU may be configured to send a message to the WLAN AP and network indicating that it is leaving the WLAN ProSe connection or session, and the LTE network or the WLAN AP may then send a message to the other WTRU about the session termination.

Figure 7:
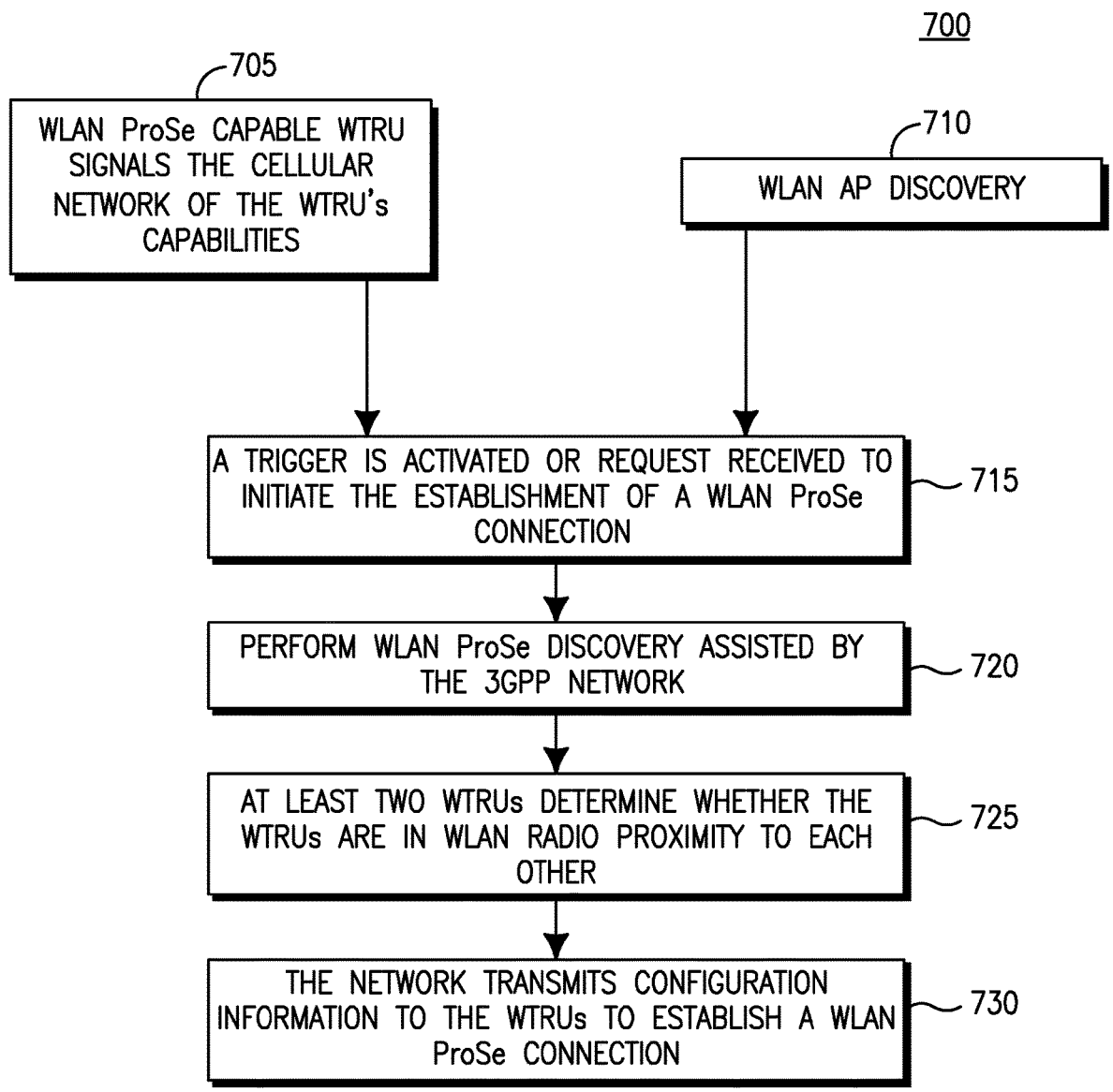
FIG. 7 is a flow diagram of an example method for WLAN ProSe connectivity via a WLAN AP.

FIG. 7 shows a flowchart 700 of an example method for WLAN ProSe connectivity via a WLAN AP. A WLAN ProSe capable WTRU signals the LTE network of the WTRU's capabilities (705). The network may need to perform WLAN AP discovery in certain situations as described herein above (710). The network may receive a request for a WLAN ProSe connection from a WTRU or alternatively, trigger a WLAN ProSe connection as described herein above (715) and may then initiate a 3GPP or LTE based WLAN ProSe discovery process (720). The WTRUs and the WLAN AP may then use the WLAN radio and the information provided by the network to determine if they are in WLAN radio proximity of each other (725). After the discovery process is complete, the network, (eNB, MME or like network node), may be configured to initiate a connection establishment procedure (730).

Described herein is direct link connection method between at least two WLAN ProSe capable WTRUs. In this embodiment, the WLAN ProSe capable WTRUs may be registered to a ProSe Server or another LTE network node. For example, the WLAN ProSe capable WTRUs may register or send WLAN information themselves with the proximity service. This WLAN WTRU ProSe server registration may be performed, for example, at registration, or via an application level explicit message to the ProSe server.

In an embodiment, a WLAN ProSe capable WTRU may register itself to the proximity server. This registration may indicate that the WLAN ProSe capable WTRU supports WLAN ProSe. The WLAN ProSe capable WTRU may include capability-related parameters in the registration, (e.g. supported data rates, supported security protocols and encryption methods), and other capabilities related to WLAN/Wi-Fi operation necessary to access a WLAN AP.

In another embodiment, the WLAN ProSe capable WTRU may also provide location information, e.g. proximity area, location area, tracking area and the like.

In another embodiment, the WLAN ProSe capable WTRU may subsequently receive control signaling from the LTE network which may provide the WLAN ProSe capable WTRU with a list of information, (as described herein above), to assist it in the configuration process. Such information may include one or a combination of the information exchanged during registration for the proximity service for the WLAN AP, which, for example, may include the WLAN network identity information, security information or location information.

The network may receive a request for a ProSe connection. This request may contain identification information including other WTRUs with which the ProSe connection may be established, (e.g. proximity ID, application ID, or another form of identification). The network may determine to trigger discovery for WLAN ProSe. In response to this determination, the network transmits the corresponding WLAN ProSe identification for WLAN discovery process. The WLAN ProSe identification may be sent as part of the configuration information or separately only at the discovery stage. The eNB may then query the Proximity Server (ProSe Server) or the MME or some other node in the EPC network. The network node which provides the WLAN ProSe identity may determine a mapping between the ProSe ID and the corresponding WLAN ProSe ID. When queried with the proximity ID, the network node may return the WLAN ProSe ID. This WLAN ProSe ID may be transmitted to the requesting WTRU for WLAN ProSe discovery. The WLAN ProSe discovery may be assisted by the cellular network.

The network may transmit a notification to the WLAN WTRUs which indicates whether the beacon or probing mechanism may be used to perform WLAN discovery (i.e. passive discovery or active discovery). In the case of active discovery, each WTRU or one of the WTRUs may transmit a probe request message to the other WTRU. This probe request message may include the configuration information received from the network. The WLAN ProSe WTRUs may be able to complete discovery based on the reply from the probe request message (i.e. the probe response message). Once this probe response message is received the WTRUs may send the discovery information to network so that the network may establish the user plane connection between the WLAN ProSe WTRUs. The network may also send a message to the WTRUs indicating the maximum number of probe responses to be sent before determining that the other WTRU cannot be discovered.

After a successful discovery process, the network may enable a data plane for a WLAN ProSe connection. The network may provide configuration information to the WTRUs. In addition to the above described configuration information which includes WLAN AP information, the network may be configured to provide at least the following configuration information. This configuration information, for example, may include the type of the direct WLAN communication between a ProSE device (e.g. WLAN ad hoc network or WLAN/Wi-Fi direct type of direct communications between the devices). In another example, the configuration information may include the SSID of the ad hoc network to be used or the name of the hotspot to be used in case of Wi-Fi direct. In another example, the configuration information may include the network may inform the devices whether to broadcast the SSID in the beacon or not, and if the SSID is not broadcast then the WLAN WTRUs may need to use the probing mechanism for discovery. In another example, the configuration information may include whether the device may broadcast ad hoc network beacon or not, (note that beacon transmission is shared among multiple WTRUs in a WLAN ad hoc network). In another example, the configuration information may include security keys for the ad hoc network to each of the WTRUs involved in WLAN ProSe connection.

The connection termination process for this method may be performed as described hereinabove. Alternatively, in the case of network initiated connection termination, the network may directly inform the WTRUs to initiate the WLAN connection teardown procedure.

Figure 8:
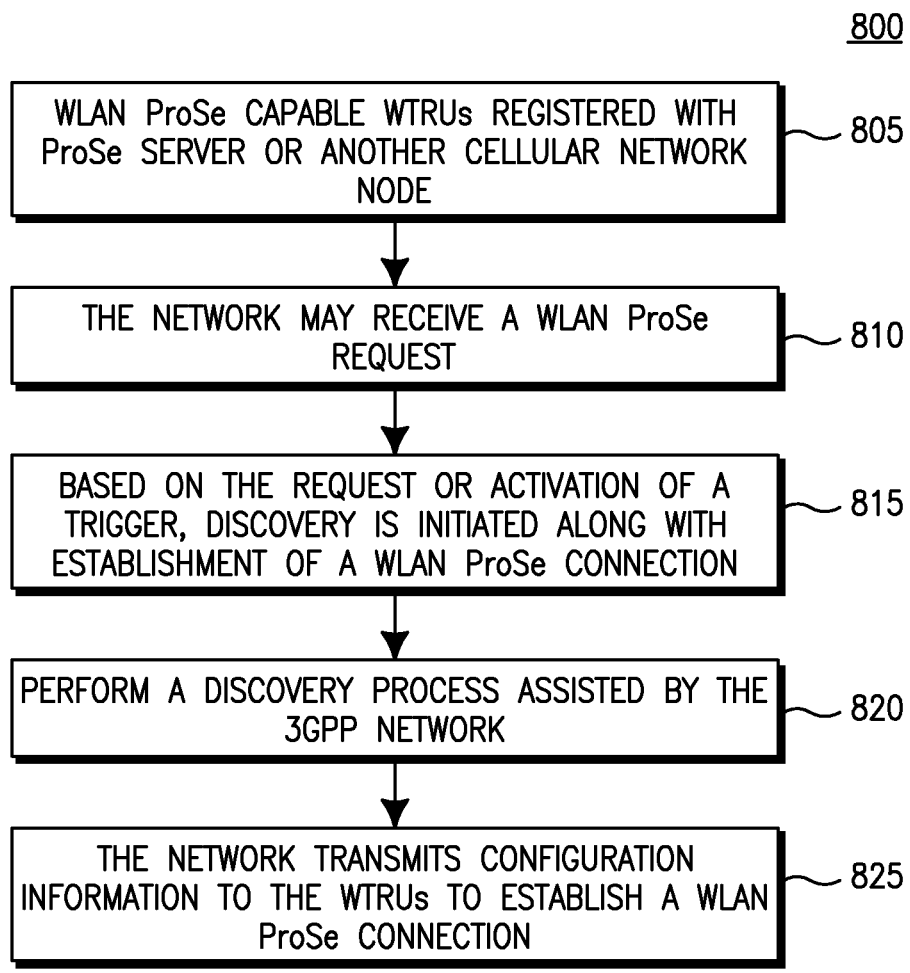
FIG. 8 shows a flowchart for a direct link connection between at least two WLAN ProSe capable WTRUs.

FIG. 8 shows a flowchart 800 for a direct link connection between at least two WLAN ProSe capable WTRUs. WLAN ProSe capable WTRUs may be registered to a ProSe Server or another LTE network node (805). The network may receive a request for a ProSe connection (810) and may trigger discovery for WLAN ProSe (815). The WTRU ProSe capable WTRU may then perform discovery (820). After a successful discovery process, the network transmits configuration information to the WTRUs to establish a direct WLAN ProSe connection with the other WLAN ProSe capable WTRU (825).

Figure 9:
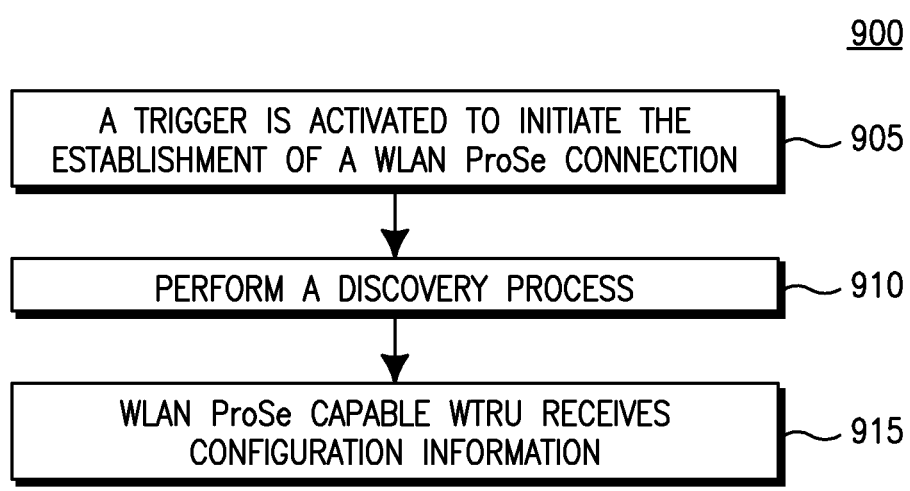
FIG. 9 shows a flowchart of a method to enable WLAN ProSe connections.

In general, FIG. 9 is a flowchart 900 of a method to enable a WLAN ProSe connection. A trigger is activated to initiate the establishment of a WLAN ProSe connection (905). A discovery process is performed to determine whether there are at least two ProSe capable WTRUs (910). The network transmits configuration information to the WTRUs to establish a WLAN ProSe connection (915).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method, performed by a network node operating in an evolved packet core (EPC) network, the network node implementing a proximity service (ProSe) function for establishing a wireless local area network (WLAN) proximity service (ProSe) connectivity between a first WLAN ProSe capable wireless transmit/receive unit (WTRU) and a second WLAN ProSe capable WTRU, the method comprising:

receiving, at the network node implementing the ProSe function, upon the first WLAN ProSe capable WTRU determining a predetermined proximity to the second WLAN ProSe capable WTRU, a request from the first WLAN ProSe capable WTRU for EPC support to establish a WLAN ProSe connection to the second WLAN ProSe capable WTRU, the request including at least an application layer identification (ID) that is an identification of the second WLAN ProSe capable WTRU;

transmitting, by the network node implementing the ProSe function, a configuration message with configuration information associated with the second WLAN ProSe capable WTRU, wherein the configuration information includes: a WLAN ProSe ID that is associated with at least the second WLAN ProSe capable WTRU, a WiFi Protected Access Pre-Shared Key (WPA-PSK) for the first WLAN ProSe capable WTRU to use for communicating ad hoc with the second WLAN ProSe capable WTRU, a frequency or channel number, a Service Set Identifier (SSID) to be associated with the first and the second WLAN ProSe capable WTRUs, and timing information, wherein the WLAN ProSe ID of the second ProSe capable WTRU and the SSID are used to perform a WLAN ProSe discovery process, and wherein the configuration message with configuration information associated with the second WLAN ProSe capable WTRU is an indication from the EPC network to establish the WLAN ProSe connection, and wherein communication over the direct WLAN ProSe connection is to be encrypted based on the WPA-PSK.

2. The method of claim 1, further comprising: determining WLAN ProSe capabilities of the first WLAN ProSe capable WTRU and the second WLAN ProSe capable WTRU.

3. The method of claim 1, wherein the configuration message is one of a radio resource control (RRC) or a Non-access stratum (NAS) message.

4. The method of claim 1, further comprising: transmitting identification of established radio bearers that need to be switched to the WLAN ProSe connection.

5. The method of claim 1, further comprising: receiving address information of the second WLAN ProSe capable WTRU at the first WLAN ProSe capable WTRU.

6. A method in a first WLAN ProSe capable wireless transmit/receive unit (WTRU) for establishing direct wireless local area network (WLAN) proximity service (ProSe) connectivity with a second WLAN ProSe capable WTRU, the method comprising:

determining a predetermined proximity to the second WLAN ProSe capable WTRU;

transmitting, to a network node implementing a ProSe function operating in an evolved packet core (EPC) network, upon determining the predetermined proximity to the second WLAN ProSe capable WTRU, a request from the first WLAN ProSe capable WTRU for EPC support to establish a WLAN ProSe connection with the second WLAN ProSe capable WTRU, the request including at least an application layer identification (ID) that is an identification of the second WLAN ProSe capable WTRU;

receiving, from the network node implementing the ProSe function, a configuration message with configuration information that is associated with the second WLAN ProSe capable WTRU, wherein the configuration information includes: a WLAN ProSe ID that is associated with at least the second WLAN ProSe capable WTRU, a WiFi Protected Access Pre-Shared Key (WPA-PSK) to use for communicating ad hoc with the second WLAN ProSe capable WTRU, a frequency or channel number, a Service Set Identifier (SSID) to be associated with the first and the second WLAN ProSe capable WTRUs, and timing information, wherein the configuration message with configuration information is an indication from the EPC network to establish the WLAN ProSe connection;

performing a WLAN ProSe discovery process using the WLAN ProSe ID of the second ProSe capable WTRU and the SSID; and establishing a direct WLAN ProSe connection with the second WLAN ProSe capable WTRU based on the configuration message, wherein communication over the direct WLAN ProSe connection is encrypted based on the WPA-PSK.

7. The method of claim 6, further comprising: transmitting location information of the first WLAN ProSe capable WTRU to the network node.

8. The method of claim 6, wherein the configuration message is one of a radio resource control (RRC) or a Non-access stratum (NAS) message.

9. A wireless transmit/receive unit (WTRU) that is a first WLAN ProSe WTRU for establishing direct wireless local area network (WLAN) proximity service (ProSe) connectivity with a second WLAN ProSe capable WTRU, the WTRU comprising:

a processor configured to determine a predetermined proximity to the second WLAN ProSe capable WTRU:

a transmitter configured to transmit, to a network node implementing a ProSe function operating in an evolved packet core (EPC) network, upon the first WLAN ProSe capable WTRU determining the predetermined proximity to the second WLAN ProSe capable WTRU, a request from the first WLAN ProSe capable WTRU for EPC support to establish a WLAN ProSe connection with the second WLAN ProSe capable WTRU, the request including at least an application layer identification (ID) that is an identification of the second WLAN ProSe capable WTRU;

a receiver configured to receive, from the network node implementing the ProSe function, a configuration message with configuration information that is associated with the second WLAN ProSe capable WTRU, wherein the configuration information includes: a WLAN ProSe ID that is associated with at least the second WLAN ProSe capable WTRU, a WiFi Protected Access Pre-Shared Key (WPA-PSK) to use for communicating ad hoc with the second WLAN ProSe capable WTRU, a frequency or channel number, a Service Set Identifier (SSID) to be associated with the first and the second WLAN ProSe capable WTRUs, and timing information, wherein the configuration message with configuration information is an indication, from the EPC network, to establish the WLAN ProSe connection, wherein the first WLAN ProSe capable WTRU is configured to perform a WLAN ProSe discovery process using the WLAN ProSe ID of the second ProSe capable WTRU and the SSID; and wherein the first WLAN ProSe capable WTRU is configured to establish a direct WLAN ProSe connection with the second WLAN ProSe capable WTRU based on the configuration message, wherein communication over the direct WLAN ProSe connection is encrypted based on the WPA-PSK.

10. The WTRU of claim 9, wherein the transmitter is further configured to transmit location information of the first WLAN ProSe capable WTRU to a network node.

11. The WTRU of claim 9, wherein the configuration message is one of a radio resource control (RRC) or a Non-access stratum (NAS) message.

* * * * *